(12) United States Patent
Kim et al.

(10) Patent No.: US 7,769,271 B2
(45) Date of Patent: Aug. 3, 2010

(54) METHOD AND APPARATUS FOR MANAGING PARENTAL LEVEL OF OPTICAL DISC

(75) Inventors: Young Kuk Kim, Pyungtaek-si (KR); Yeo Han Yun, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 1295 days.

(21) Appl. No.: 10/792,272

(22) Filed: Mar. 4, 2004

(65) Prior Publication Data
US 2004/0213554 A1 Oct. 28, 2004

(30) Foreign Application Priority Data
Mar. 5, 2003 (KR) ........................ 10-2003-0013803
Mar. 2, 2004 (KR) ........................ 10-2004-0013889

(51) Int. Cl.
*H04N 5/91* (2006.01)
*H04N 5/00* (2006.01)

(52) U.S. Cl. ........................... 386/94; 386/46; 386/125

(58) Field of Classification Search ................. 386/94, 386/125, 46
See application file for complete search history.

(56) References Cited

U.S. PATENT DOCUMENTS

| | | | | |
|---|---|---|---|---|
| 5,933,569 A | * | 8/1999 | Sawabe et al. ................ 386/94 |
| 6,385,388 B1 | * | 5/2002 | Lewis et al. ................... 386/94 |
| 6,519,412 B1 | * | 2/2003 | Kim ............................. 386/94 |
| 2001/0037459 A1 | | 11/2001 | Ogawa et al. |
| 2002/0067671 A1 | * | 6/2002 | Park .......................... 369/53.2 |
| 2003/0026593 A1 | * | 2/2003 | Ostrover ....................... 386/54 |
| 2004/0208488 A1 | * | 10/2004 | Fuchigami et al. ............ 386/96 |
| 2005/0089309 A1 | * | 4/2005 | Ando et al. ................... 386/95 |

OTHER PUBLICATIONS

European Search Report dated Mar. 13, 2009.

* cited by examiner

*Primary Examiner*—Marsha D Banks Harold
*Assistant Examiner*—Asher Khan
(74) *Attorney, Agent, or Firm*—Ked & Associates LLP (57) ABSTRACT

Method and apparatus for managing a parental level of an optical disc can allow a user to set a parental level of a data stream recorded and stored on a rewritable optical disc or write-once optical disc, and can record and manage the set parental level as navigation information such as for the optical discs. The method and apparatus allow the user to conveniently set or change the parental level of the data stream, refer to the parental level recorded and managed therefore, and carry out a parental locking operation such that children or teenagers cannot arbitrarily reproduce a data stream of an adult program. Further, a parental grade code, a supplemental parental grade code or if the parental code was generated using parental management information previously supplied by the user can be determined. Accordingly, an authorized user can determine whether the previous set grade code is changed illegally.

27 Claims, 6 Drawing Sheets

*(Video Recording)*

METHOD AND APPARATUS FOR MANAGING PARENTAL LEVEL OF OPTICAL DISC

BACKGROUND OF THE INVENTION

1. Field of the Invention

The present invention relates to storing and managing data, and a method and apparatus for managing a parental level of an optical disc.

2. Background of the Related Art

Conventionally, an optical disc capable of recording and storing a large amount of digital data is exemplified by, for example, a Compact Disc (CD) having a recording capacity of about 650 Mbytes, a Digital Versatile Disc (DVD) having a recording capacity of about 4.7 Gbytes, and a Blu-ray Disc (BD) having a recording capacity of about 23 Gbytes or more. Conventional optical disc apparatus such as a disc player can read and reproduce a digital data stream recorded on a read-only optical disc.

A user can also command an optical disc apparatus such as a disc recorder to record and store desired video and audio data on the rewritable optical disc or write-once optical disc. Moreover, the optical disc apparatus allows the user to watch and hear the data reproduced as high-quality video and audio data through a corresponding screen such as a screen of a peripheral device such as a television or the apparatus itself.

Where the user records and stores the data stream of an adult program on the optical disc using the optical disc apparatus such as the disc recorder, there exists a long felt need for recording and managing parental level information so that children or teenagers cannot arbitrarily reproduce or watch the data stream of the adult program recorded and stored on the optical disc. However, a parental level management method is not provided, for example, in a DVD-video recording format or a DVD-stream recording format.

A playback control method based on a BD-recording format reproduces a corresponding program or tide only where the user inputs a previously set password after a playback prohibition flag is set to each program or title. However, no parental level management method has been provided.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide a method and apparatus for managing a parental level of an optical disc.

Another object of the present invention to provide a method and apparatus for managing a parental level of an optical disc that can record and manage parental level as navigation information appropriate for the optical disc.

Another object of the present invention to provide a method and apparatus for managing a parental level of an optical disc that can allow a user to selectively designate or change a parental code of a data stream recorded and stored on or corresponding to the optical disc, which can include a write-once or rewritable optical disc.

Another object of the present invention to provide a method and apparatus for managing a parental level of an optical disc that can check the parental grade code and generate a new parental grade code based on the result of the checking.

Another object of the present invention to provide a method and apparatus for managing a parental level of an optical disc that can generate and record information for indicating the generation of modified parental grade code.

Another object of the present invention to provide a method and apparatus for managing a parental level of an optical disc that can generate and record information for indicating the generation of new parental grade code and display a message including the information corresponding to at least one of the new parental grade code and the information for indicating the generation of the new parental grade code.

In order to achieve at least the above objects and advantages in a whole or in part, in accordance with one aspect of the present invention there is provided a method that includes detecting a first parental grade code as a parental code corresponding to a video signal, generating a second parental code as the parental code when the first parental code is not detected and generating information that indicates the generation of the second parental code.

To further achieve at least the above objects and advantages in a whole or in part, in accordance with one aspect of the present invention there is provided a recording medium that includes a first memory area configured to store a video signal, a second memory area configured to store a parental code that controls viewing access to a video program in the video signal, wherein the parental code is configured to be renewed by a command and a third memory area configured to store status information indicating the renewal of the parental code.

To further achieve at least the above objects and advantages in a whole or in part, in accordance with one aspect of the present invention there is provided an apparatus for managing a parental control code, that includes a detector that detects a first parental grade code as a parental code corresponding to a video signal, and a parental code generator that generates a second parental code as the parental code when the first parental code is not provided as the parental code with a video signal.

To further achieve at least the above objects and advantages in a whole or in part, in accordance with one aspect of the present invention there is provided an optical disc player that includes a first memory area configured to store a video signal, a second memory area configured to store a parental code that controls viewing access to a video program in the video signal, wherein the parental code is configured to be renewed by a command and a controller configured to detect a first parental grade code as a parental code corresponding to a video signal, wherein the controller is configured to generate a second parental code as the parental code when the first parental code is not detected.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
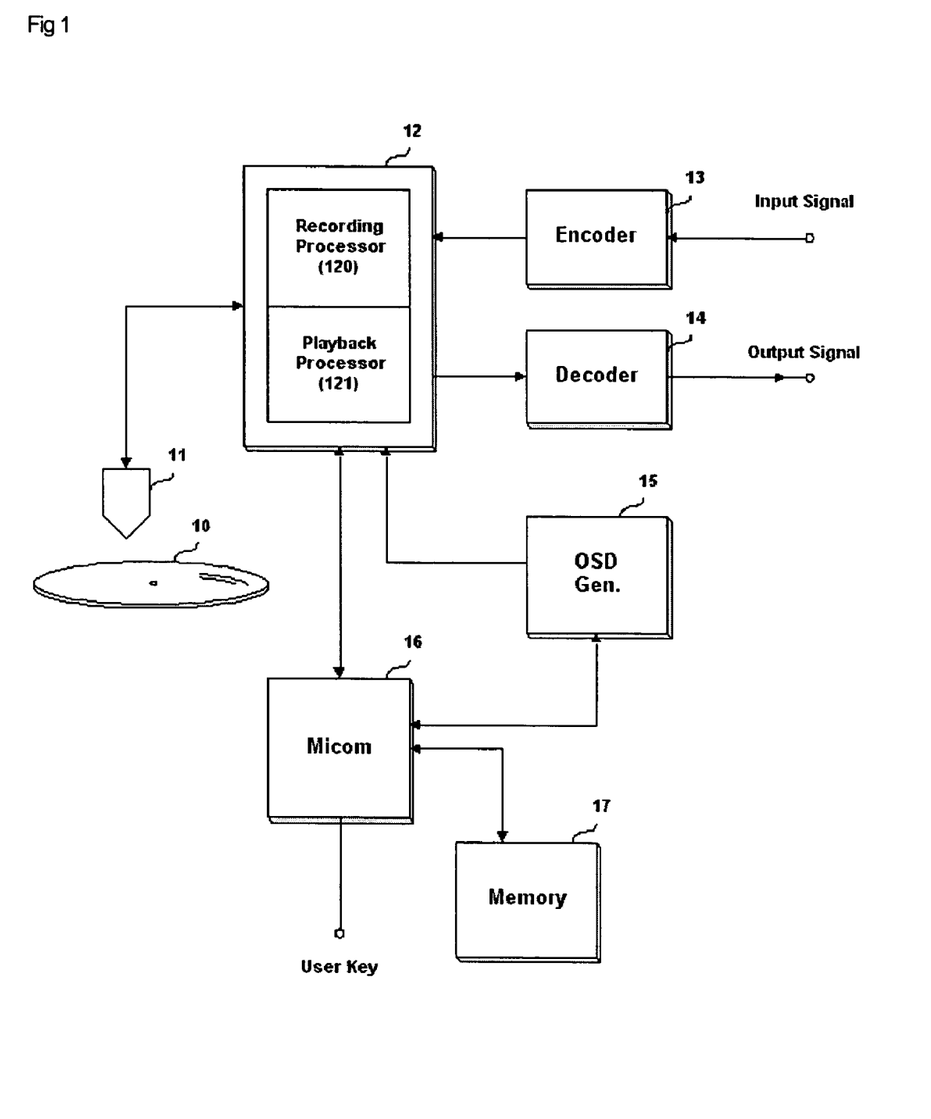
FIG. 1 is a diagram illustrating a preferred embodiment of an optical disc apparatus for managing a parental level of an optical disc in accordance with the present invention.

FIG. 1 is a diagram showing a configuration of an embodiment of an optical disc apparatus for managing a parental level of an optical disc in accordance with the present invention. The optical disc apparatus such as a disc recorder or the like can include an optical pickup 11, a VDR (Video Disc Recorder) system 12, an encoder 13, a decoder 14, an OSD (On Screen Display) generator 15, a microcomputer (Micom) 16 and a memory 17.

The VDR system 12 can include a recording processor 120 for recording data and a playback processor 121. The encoder 13 can convert an externally inputted audio and video signal into digital data appropriate for recording, and the decoder 14 can convert playback audio and video data into an analog audio and video signal that an external peripheral device such as a television, speaker or the like can accommodate. The decoder 14 can output the analog audio and video signal.

The memory 17 can record and store OSD graphic images corresponding to various selection menu items. For example, the microcomputer 16 can control an operation of the recording processor 120 of the VDR system 12 and can terminate a data recording operation while the data recording operation is carried out. Alternatively, the microcomputer 16 can read and output an OSD graphic image recorded and stored in the memory 17 corresponding to an item of a user setting menu in response to a user's request.

The read and outputted OSD graphic image is preferably outputted to the OSD generator 15. An operation of the OSD generator 15 can be controlled such that an OSD graphic image corresponding to an item of the user setting menu can be outputted and displayed on a screen of the external peripheral device such as the television through the VDR system 12.

Figure 2:
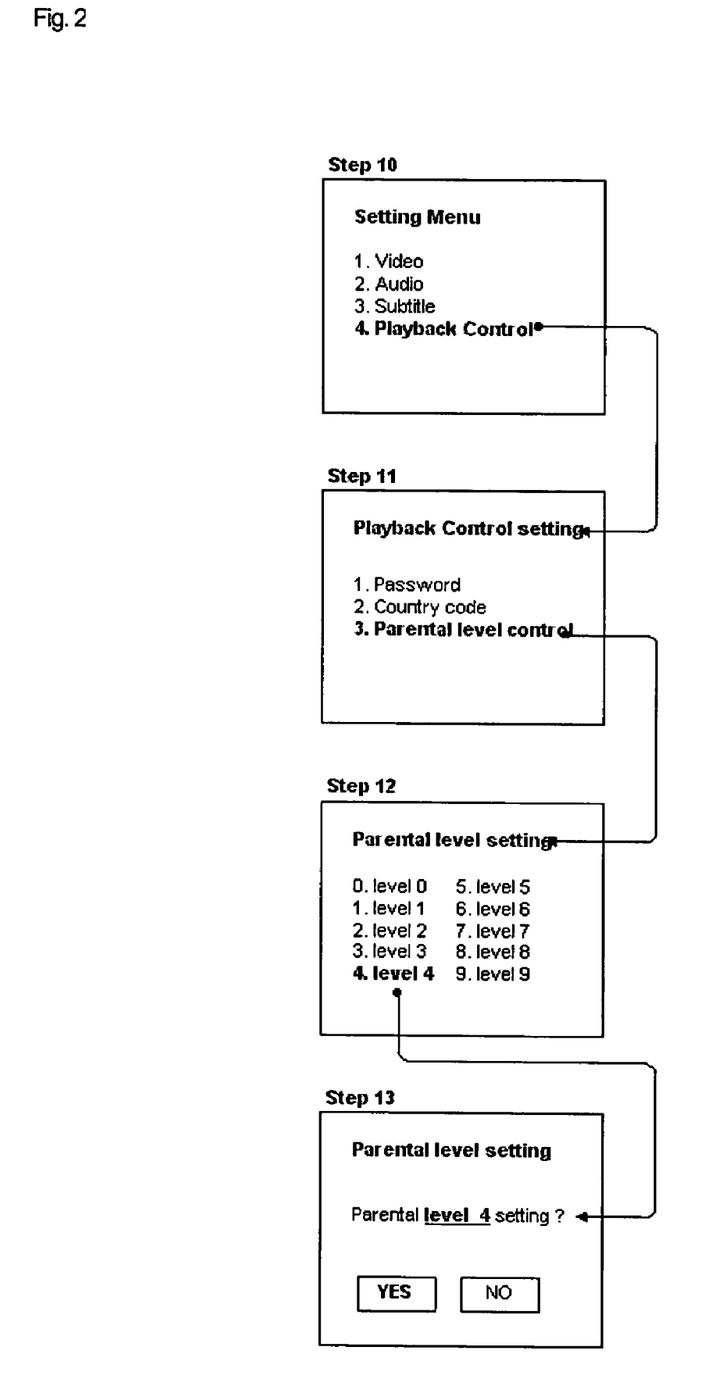
FIG. 2 is a diagram illustrating a preferred embodiment of a method for managing a parental level of an optical disc in accordance with the present invention.

Operations of the optical disc apparatus will now be described. As shown in FIG. 2, according to an operation control by the microcomputer 16, an OSD graphic image including various items of the user setting menu can be displayed on a screen. The user setting menu can include video, audio, subtitle, playback control, etc., displayed on the screen (block 10).

Where the playback control item is selected and designated through the OSD graphic image by the user, the microcomputer 16 can control operations of the OSD generator 15. At this time, the OSD graphic image including various items of password, country code, parental level control, etc. can be displayed on the screen (block 11).

Where the user selects and designates the parental level control item, the microcomputer 16 can control the operation of the OSD generator 15. At this time, the OSD graphic image including a plurality of level items can be displayed on the screen so that the user can select and designate an arbitrary parental level (block 12).

Where the user designates an arbitrary parental level, there can be displayed the OSD graphic image of a guidance message. The guidance message, for example, can ask or confirm whether the user wishes to set the designated parental level as parental management information (block 13).

The user can set the designated parental level as parental management information. When the user sets the designated parental level as the parental management information, the microcomputer 16 can record and store a code value of the parental level (e.g., set through the above-described series of processes) as navigation information appropriate for the optical disc.

Figure 3:
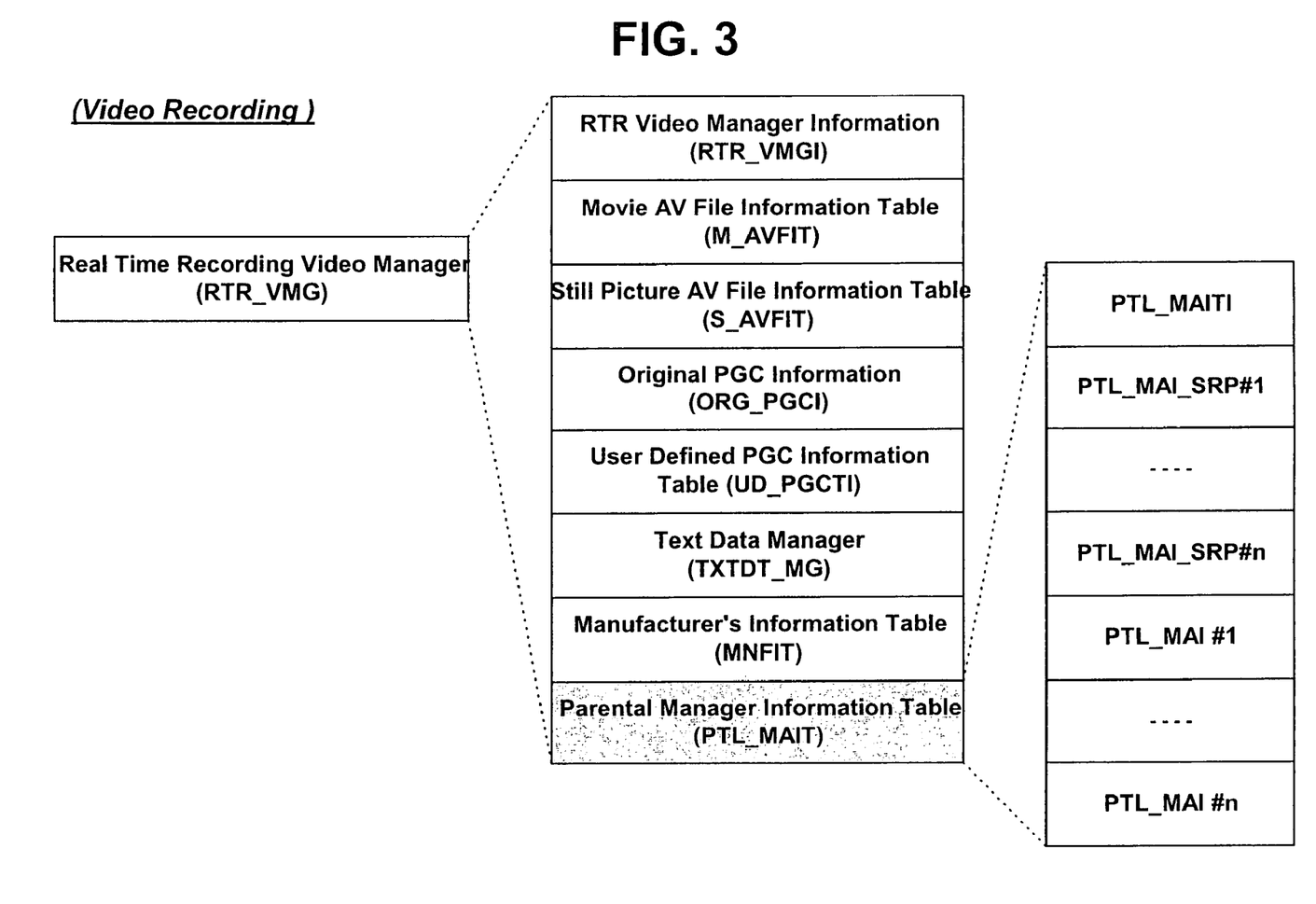
FIG. 3 is a diagram illustrating an exemplary embodiment of containing and recording parental management information in a real-time recording video manager based on a video recording format in accordance with the present invention.

In accordance with an embodiment of the present invention, for example, where a type of the optical disc is a DVD-RW (Digital Versatile Disc-Rewritable) based on a DVD-video recording format, a parental manager information table PTL_MAIT can be newly defined and additionally recorded within a real-time recording video manager RTR_VMG as shown in FIG. 3. Moreover, parental management information PTL_MAI corresponding to the code value of the parental level selected and designated by the user can be recorded and managed within the parental manager information table PTL_MAIT.

A parental management information search pointer PTL_MAI_SRP can be recorded and managed such that the parental management information PTL_MAI can be searched. Moreover, general management information such as the number of parental management information items can be recorded and managed as parental manager information table information PTL_MAITI.

Figure 4:
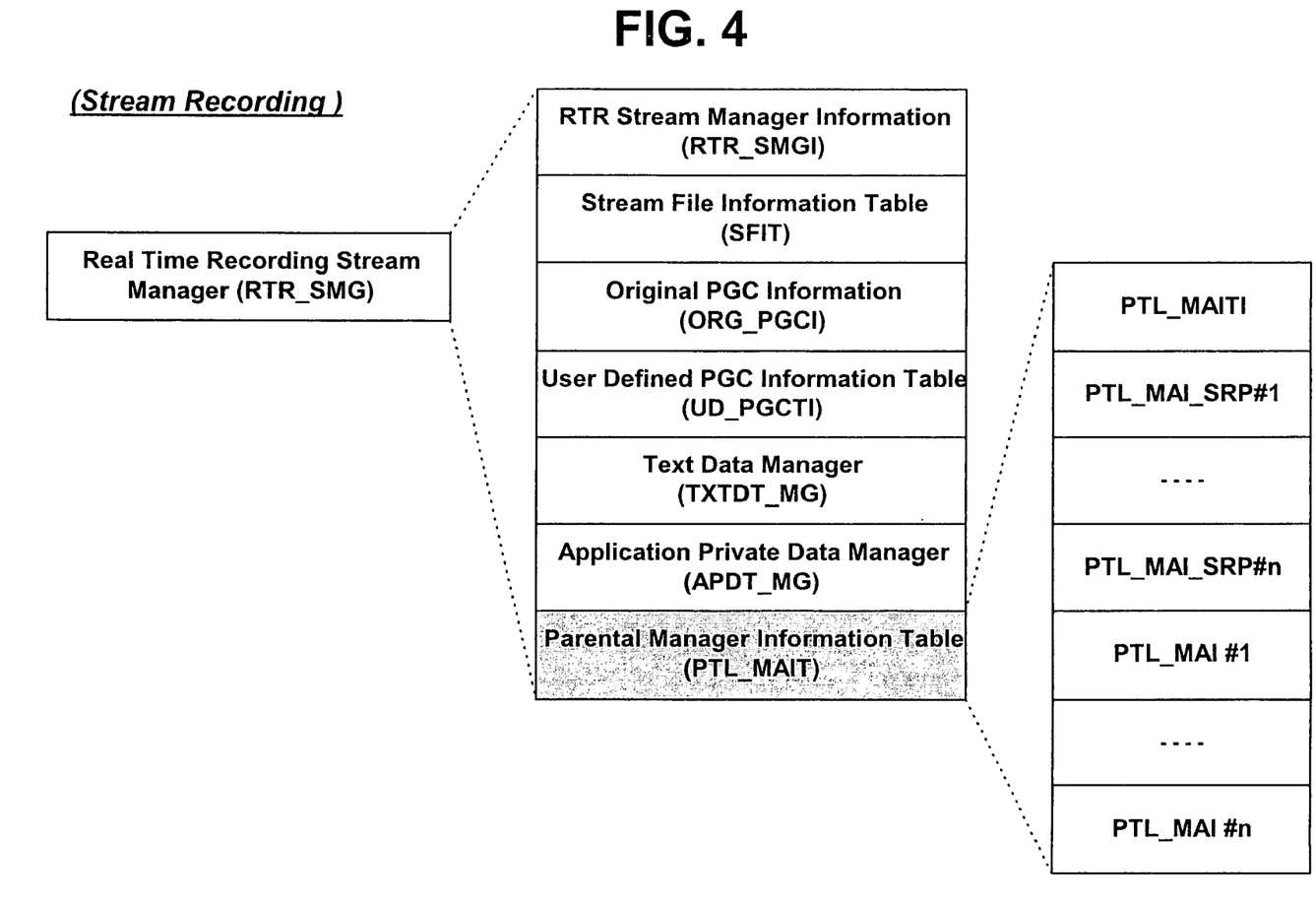
FIG. 4 is a diagram illustrating an exemplary embodiment of containing and recording parental management information in a real-time recording stream manager based on a stream recording format in accordance with the present invention.

In accordance with another embodiment of the present invention, for example, where a type of the optical disc is the DVD-RW based on a DVD-stream recording format, a parental manager information table PTL_MAIT can be newly defined and additionally recorded within a real-time recording stream manager RTR_SMG as shown in FIG. 4. Moreover, parental management information PTL_MAI corresponding to the code value of the parental level selected and designated by the user can be recorded and managed within the parental manager information table PTL_MAIT.

A parental management information search pointer PTL_MAI_SRP can be recorded and managed such that the parental management information PTL_MAI can be searched. Moreover, general management information such as the number of parental management information items can be recorded and managed as parental manager information table information PTL_MAITI.

Thus, where the user requests the playback of an arbitrary program or title in a state that the optical disc, on which the parental management information is recorded and managed (e.g., using the above-described processes), is inserted into an optical disc apparatus such as a disc player or a disc recorder, the optical disc apparatus can refer to the parental management information contained in the parental manager information table PTL_MAIT and can perform a parental locking operation. The parental locking operation of the optical disc apparatus can ensure that children or teenagers cannot arbitrarily reproduce a data stream of an adult program.

For example, where a parental level, corresponding to an arbitrary program requested for playback by the user, is set as a parental level corresponding to the adult program, the user can be requested to input a password. Then, if the inputted password is valid, the corresponding program can be reproduced. Otherwise, if the inputted password is not valid, a message indicating that the corresponding program cannot be reproduced is outputted.

Figure 5:
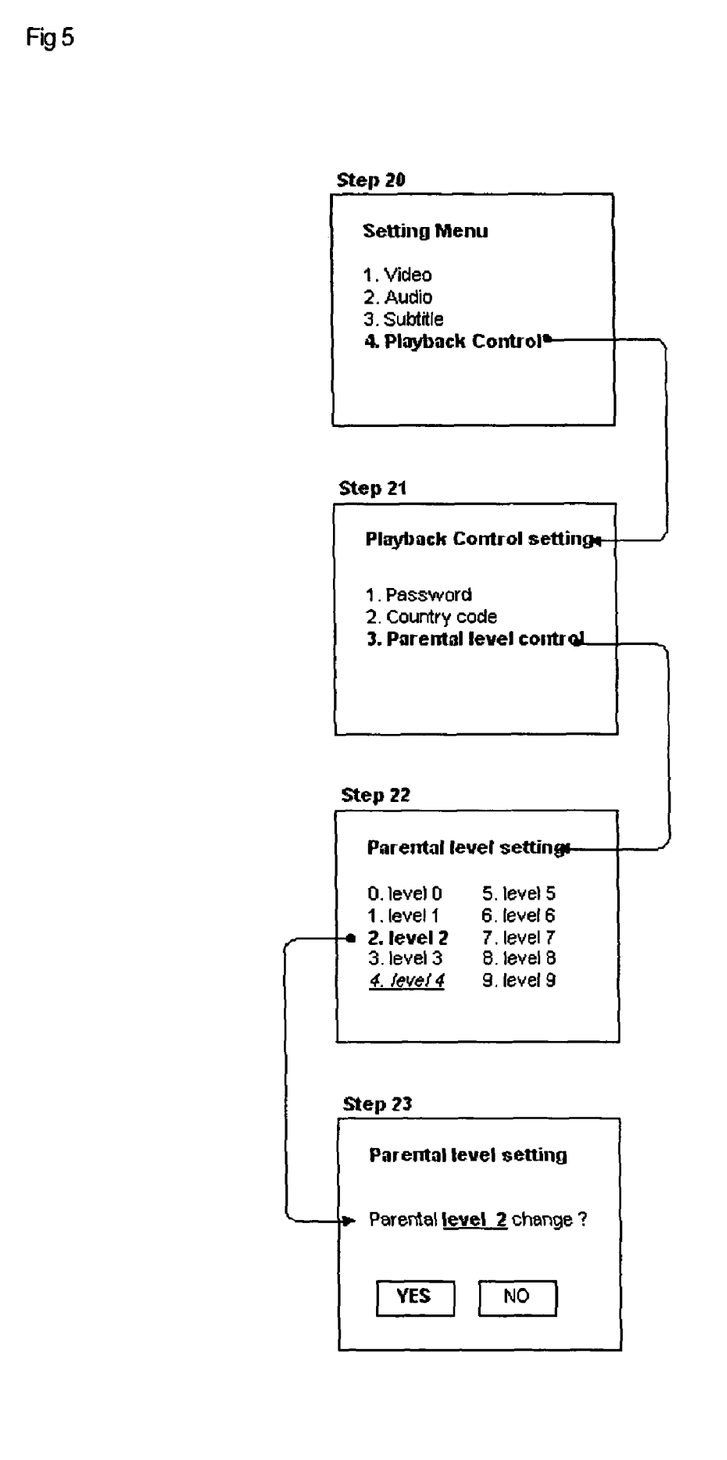
FIG. 5 is a diagram illustrating a preferred embodiment of a method for managing a parental level of an optical disc in accordance with the present invention.

The parental management information recorded and managed can be changed to another level in response to the user's request. FIG. 5 is a diagram illustrating a preferred embodiment of a method for managing a parental level of an optical disc in accordance with the present invention The method of FIG. 5 can be applied to and will be described using the optical disc apparatus of FIG. 1. However, the present invention is not intended to be so limited.

As shown in FIG. 5, the microcomputer 16 can control an operation of the playback processor 121 of the VDR system 12. While a data playback operation is carried out, the microcomputer 16 can read and output an OSD graphic image recorded and stored in the memory 17 corresponding to an item of the user setting menu in response to the user's request.

The read and outputted OSD graphic image can be provided to the OSD generator 15. Operations of the OSD generator 15 can be controlled such that an OSD graphic image corresponding to an item of the user setting menu can be outputted and displayed on the screen of the external peripheral device such as the television through the VDR system 12.

As shown in FIG. 5, according to the operation control of the microcomputer 16, an OSD graphic image including various items of the user setting menu such as video, audio, subtitle, playback control, etc., can be displayed on the screen (block 20). Where the playback control item is selected and designated through the OSD graphic image by the user, the microcomputer 16 can control an operation of the OSD generator 15. At this time, the OSD graphic image including various items of password, country code, parental level control, etc. is preferably displayed on the screen (block 21).

Then, where the user selects and designates the parental level control item, the microcomputer 16 can control the operation of the OSD generator 15. At this time, the OSD graphic image including a plurality of level items is displayed on the screen so that the user can change and designate an arbitrary parental level (block 22). At this time, an item of a pre-set parental level can be indicated (e.g., by a highlight or arbitrary color) on the OSD graphic image.

Where the user designates an arbitrary parental level, there can be displayed the OSD graphic image of a guidance message asking whether the user wishes to change the designated parental level as parental management information for controlling the playback of a corresponding program or data stream of a title (block 23).

Then, if the user changes the designated parental level as the parental management information, the microcomputer 16 can update and store a changed code value of the parental level (e.g., using the above-described processes) as navigation information appropriate for the optical disc. For example, the navigation information can be the parental management information PTL_MAI within the real-time recording video manager RTR_VMG, real-time recording stream manager RTR_SMG or the like.

Thus, where the user requests the playback of an arbitrary program or title in a state that the optical disc, on which the parental management information is changed and recorded, is inserted into an optical disc apparatus such as a disc player or a disc recorder, the optical disc apparatus can refer to the parental management information updated and recorded (e.g., in the parental manager information table PTL_MAIT) and can perform a parental locking operation such that children or teenagers cannot arbitrarily reproduce a data stream of an adult program.

For example, where a parental level corresponding to an arbitrary program requested for playback by the user is set as a parental level corresponding to the adult program, the user is requested to input a password. Then, if the inputted password is valid, the corresponding program is reproduced. Otherwise, if the inputted password is not valid, a message indicating that the corresponding program cannot be reproduced is outputted.

The OSD graphic images for setting and changing the parental level can be directly or automatically outputted and displayed prior to a data recording operation or a data playback operation. Moreover, operations of setting the parental level can be carried out preferably only where authorizing input information (e.g., a valid password) is inputted.

Since parental levels are different (e.g., according to countries), values of the parental levels corresponding to a country code designated by the user can be outputted and displayed. Thus, operations of setting a parental level appropriate for a corresponding country can be accomplished.

However, there can be a disadvantage in an optical disc apparatus where parental management information can be updated and recorded in a parental manager information table or the like. Further, an optical disc apparatus can use authorizing input information (e.g., a password comparison) for un-locking a playback prohibition flag. There may not be a specific code corresponding to a parental lock code.

Further, there is no suggestion for determining whether the input video signal contains a parental grade code, a supplemental parental grade code or if the parental code was generated using parental management information previously supplied by the user. Accordingly, an authorized user (e.g., adult) may not know or be able to determine whether the previous set grade code (e.g., user supplied or manufacturer supplied parental code lock) is changed illegally or not (e.g., by an unintended user) unless the present grade code is not identified in a set up menu or the like (e.g., authorized user verified).

Figure 6:
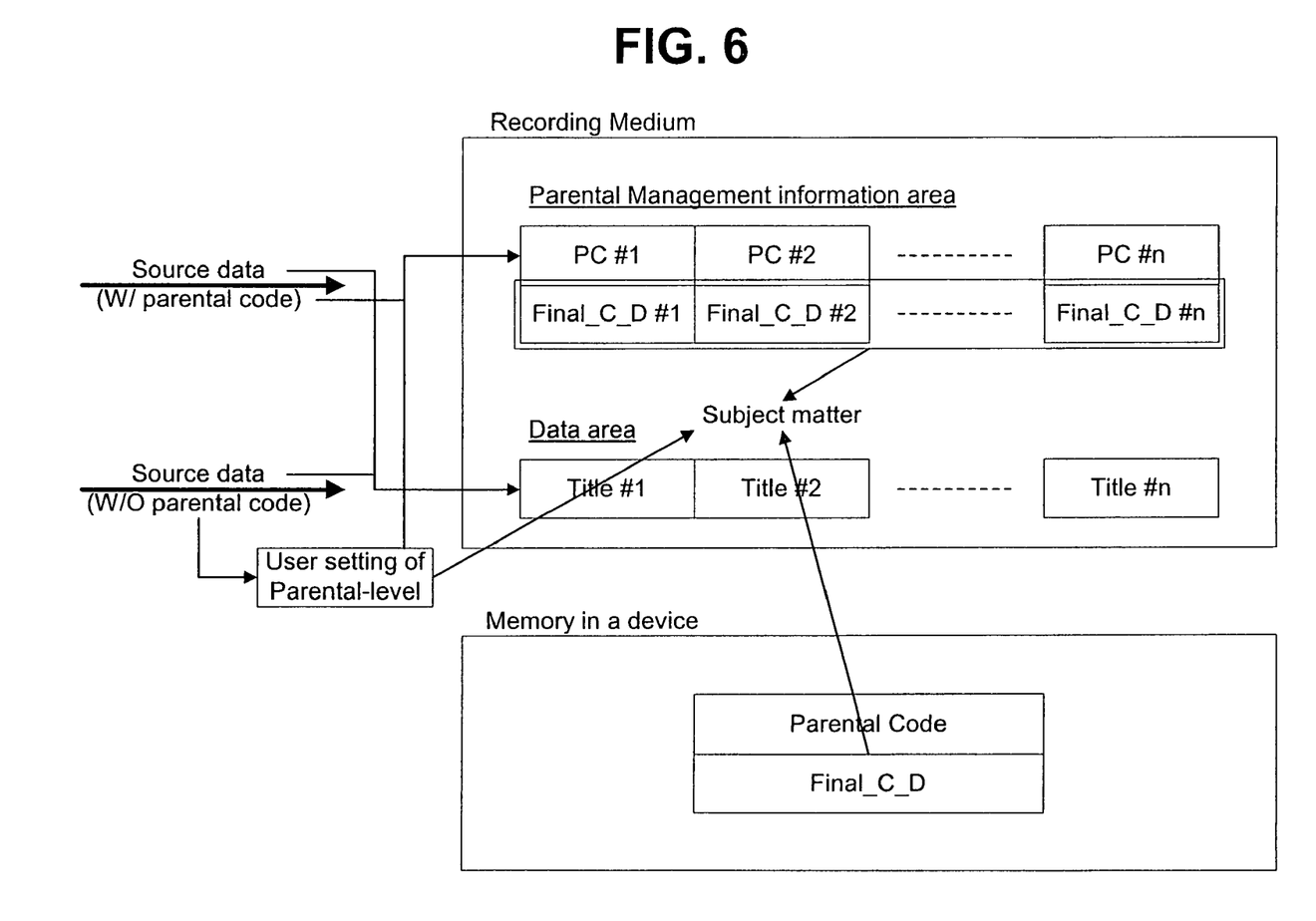
FIG. 6 is a diagram showing a preferred embodiment of an information management control method for managing a parental level of an optical disc in accordance with the present invention.

FIG. 6 is a diagram showing an embodiment of an information management control method for managing a parental level of an optical disc in accordance with the present invention. The method of FIG. 6 can be applied to and will be described using the optical disc apparatus of FIG. 1. However, the present invention is not intended to be so limited.

As shown in FIG. 6, an optical disc apparatus can be provided with a recording medium having plurality of information stored thereon including a plurality of programs that each can include title, data and parental management information among other information. Operations of the optical disc apparatus when a program (e.g., a recording medium) is provided will now be described.

When a source data is supplied (e.g., a recording medium is selected), one among a plurality of titles or programs thereon can be selected for playback. The selected tide can be processed to determine whether a first parental grade code for controlling a parental view is contained thereon. The first parental grade code can be information received and associated with a video signal inputted from an external source. The first parental grade code can be information corresponding to or provided with the video signal. Thus, the first parental grade previously set and recorded in a memory (e.g., of the recording medium).

When the supplied source data does not have a parental grade code thereon, a user setting process of a parent grade code or level can be completed. For example, a second parental grade code can be generated as a default value by a command (e.g., preset) based on the detection result (e.g., adult grade). Alternatively, the second parental grade code can be generated as a value set by a user based on the detection result. However, the present invention is not intended to be so limited. For example, the second parental grade code can be generated and include added information or increased granularity even when the first parental grade code is detected.

Thus, using the above-described processes, the parental code (e.g., PC#1, PC#2, . . . PC#n) can be set for a plurality of titles prior to playback or recording by an optical disc device. Accordingly, playback or recoding of such program content can be controlled by parental management control information such as password entry to access or change parental grade level.

Then, information can be generated for indicating the generation of the second parental grade code. Preferably, the information (e.g., Final Changed data of the parental code) can indicate a history of use or time interval of the parental code sufficient to manage and monitor authorized and unauthorized use, modification or access. Thus, a tracking can be directly or automatically maintained for the parental grade code (e.g., changed, added or the like) using the generated information.

The generated information (e.g., Final C_D#1, Final C_D#2, ... , Final C_D#n) for indicating the generation of the second parental grade code can be maintained by the optical disc apparatus. In other words, the generated information regarding recording the second parental grade code and the information for indicating the generation of the second parental grade code are preferably recorded. For example, the generated information can be stored on the recording medium itself or in a memory of the apparatus.

Thus, the optical disc apparatus or recoding medium, individually or in combination, can record the second parental grade code and the information for indicating the generation of the second parental grade code. For example, a first storage area can be provided for recording a video signal, a second storage area can be provided for recording a parental code (e.g., second and/or first) for controlling a parental view and a third storage area provided for recording information indicating the renewal or the like of the parental grade code. Preferably, the parental grade code can be renewed by a command. Further, data stored in the third storage area can be displayed using a similar process as the data of the second storage area.

The generated information can be time information (e.g., a time stamp) when the second parental grade code is generated. Alternatively, the generated information can be an indication of the authorizing user or an authorizing device or the like.

Preferably, the generated information is provided by displaying the same for a predetermined time before the video program playbacks or in playing the video program. The generated information can be displayed using a message including the information corresponding to at least one of the second parental grade code and the information for indicating the generation of the second parental grade code. The generated information can also be supplied upon a user request such as via an OS graphic image or the like.

As described above, a unit of a video program can generate the parental grade codes (e.g., program by program). However, the present invention is not intended to be so limited. For example, the parental grade codes can be generated by a unit of a device playing the video program (e.g., device by device) or an identifiable (e.g., video) source.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments according to the present invention provide a method and apparatus for managing a parental level of an optical disc. Embodiments according to the present invention can allow a user to set or change a parental level of a data stream recorded and stored on an optical disc, refer to the parental level recorded and managed on the optical disc, and carry out a parental locking operation such that children or teenagers cannot arbitrarily reproduce a data stream of an adult program, individually or in combination. Further, embodiments of an apparatus and method can allow an authorized user to receive generated information such as an alert or status information regarding an access or modifications to a user supplied or system parental grade code.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method, comprising:
   determining whether a first parental grade code is included with a video signal;
   generating a second parental code when the first parental grade code is not included with the video signal,
   storing the second parental code in a navigation area of a disc from which the video signal is received, the second parental code corresponding to a first user-selected parental level selected from a plurality of parental levels; and
   blocking viewing of an entire program corresponding to the video signal based on detection of the second parental code in the navigation area of the disc, said method further comprising:
   generating an on-screen display (OSD) menu listing the parental levels,
   receiving a second user-selected parental level based on a selection of one of the parental levels in the OSD menu, the second user-selected parental level being different from the first user-selected parental level, and
   changing the first user-selected parental level to the second user-selected parental level on the disc, said changing including storing a code corresponding to the second user-selected parental level in the navigation area of the disc to be used in place of the first user-selected parental level previously stored in the navigation area of the disc.

2. The method of claim 1, wherein the first parental code is information received and associated with the video signal, and wherein the video signal is received from an external source.

3. The method of claim 1, wherein the first parental code is information recorded in a memory of a recordable medium or an optical disc player.

4. The method of claim 1, wherein the second parental code is generated as a default value.

5. The method of claim 4, wherein the default value is responsive to one of a source of the video signal, a channel of the video signal, an actor or a title.

6. The method of claim 1, wherein the second parental code is generated as a value set by the user.

7. The method of claim 1, wherein the first and second parental codes are generated by a unit of a video program, a recording medium or a unit of a device producing the video program.

8. The method of claim 1, wherein the disc includes a plurality of video programs.

9. The method of claim 7, wherein an optical disc player for reproducing the disc includes a single parental code level.

10. The method of claim 1, wherein the information is time information indicating when the second parental code is generated.

11. The method of claim 1, further comprising:
generating an on-screen display (OSD) menu including a number of playback control options;
displaying a message when a parental control option is selected from the menu, wherein the plurality of parental levels are displayed in selectable form when the parental control option is selected; and
receiving a signal from the user selecting one of the parental levels corresponding to the second parental code.

12. The method of claim 11, wherein the displaying a message comprises one of displaying the message for a predetermined time before a corresponding video program plays back or displaying the message until acknowledged by appropriate user action.

13. The method of claim 1, wherein the second parental code is recorded in at least one of a memory provided in a device or a mobile recording medium.

14. The method of claim 1, wherein the disc includes:
a first memory area to store a video signal,
a second memory area including the navigation area to store the second or third parental code for blocking viewing of the entire program corresponding to the video signal, wherein the parental code is configured to be changed by a command, and
a third memory area to store status information indicating the renewal of the parental code.

15. A recording medium, comprising:
a first memory area configured to store a video signal;
a second memory area configured to store a first parental code that controls viewing access to a video program in the video signal, wherein the first parental code is one of a user-selected or default code configured to be updated and recorded in the second memory area with another user-selected code by a command; and
a third memory area configured to store status information indicating the renewal of the first parental code recorded in the second memory area, wherein use of the first parental code is changed to a second parental code stored in the second memory area, the second parental code being one of a plurality of user-selected parental levels different from a parental level indicated by the first parental code.

16. The recording medium of claim 15, wherein the status information includes at least one of time information, final change data, or an alert generated based on storage of the second parental code in the second memory area.

17. The recording medium of claim 16, wherein the status information is time stamp information when use of the first parental code is changed to the second parental code.

18. The recording medium of claim 15, wherein use of the first parental code is changed to the second parental code based on at least one of a reset operation performed by a user, an access operation performed by the user, or a user entry performed based on an authorized password.

19. The recording medium of claim 18, wherein the status information is a history interval recording over a prescribed period of time or a prescribed number of accesses by the user.

20. The recording medium of claim 15, wherein the memory areas are provided on at least one of a memory provided in a device or a mobile recording medium.

21. An apparatus for managing a parental control code, comprising:
a detector that is capable of detecting a first parental grade code as a parental code corresponding to a video signal;
a parental code generator that generates a second parental code as the parental code when the first parental grade code is not provided with a video signal, and
a memory that stores status information indicating generation of the second parental code, wherein:
the second parental code corresponds to one of a plurality of parental levels selected by a user for the video signal,
the second parental grade code is stored in a navigation area of a disc from which the video signal is received, and
detection of the second parental code in the navigation area of the disc is used as a basis for blocking viewing of an entire program corresponding to the video signal, said apparatus further comprising:
an on-screen display (OSD) generator to generate a menu of the parental levels,
wherein the parental code generator generates a third parental grade code selected by a user corresponding to one of the parental levels listed in the menu, the third parental grade code indicating a parental level different from a parental level indicated by the second parental grade code, and wherein a controller changes the second parental grade code to the third parental grade code, the change including storing the third parental grade code in the navigation area of the disc to be used in place of the second parental grade code previously stored in the navigation area of the disc.

22. The apparatus of claim 21, wherein the second parental code is one of generated as a default value and generated as value set by a user.

23. The apparatus of claim 21, further comprising:
an optical pickup for inputting and outputting data for a loaded recording medium.

24. The method of claim 1, wherein the first parental grade code is a code that is pre-recorded on the disc.

25. The method of claim 1, wherein the second parental grade code is recorded in a section corresponding to a real-time recording video manager (RTR_VMG) on the disc.

26. The method of claim 1, wherein the second parental code is recorded in a section corresponding to a parental manager information table (PTL_MAIT) on the disc.

27. The method of claim 1, wherein the disc includes a plurality of titles and wherein second parental codes are generated and recorded in the navigation area of the disc when no corresponding first parental codes are detected from the disc for the titles.

* * * * *